(12) United States Patent
Whelan

(10) Patent No.: US 10,592,781 B2
(45) Date of Patent: Mar. 17, 2020

(54) DEVICES AND METHOD FOR SCORING DATA TO QUICKLY IDENTIFY RELEVANT ATTRIBUTES FOR INSTANT CLASSIFICATION

(71) Applicant: The Boeing Company, Chicago, IL (US)

(72) Inventor: John Desmond Whelan, Burien, WA (US)

(73) Assignee: The Boeing Company, Chicago, IL (US)

(*) Notice: Subject to any disclaimer, the term of this patent is extended or adjusted under 35 U.S.C. 154(b) by 410 days.

(21) Appl. No.: 14/335,473

(22) Filed: Jul. 18, 2014

(65) Prior Publication Data

US 2016/0019285 A1    Jan. 21, 2016

(51) Int. Cl.
G06K 9/62 (2006.01)

(52) U.S. Cl.
CPC .................. G06K 9/6267 (2013.01)

(58) Field of Classification Search
CPC ......... G06F 17/30705; G06F 17/30598; G06F 17/30088; G06F 17/3053; G06K 9/6267
See application file for complete search history.

(56) References Cited

U.S. PATENT DOCUMENTS

| | | | | |
|---|---|---|---|---|
| 6,021,383 A * | 2/2000 | Domany | ........... | G06F 17/30705 382/225 |
| 6,629,097 B1 * | 9/2003 | Keith | ................ | G06F 17/30598 |
| 7,174,343 B2 * | 2/2007 | Campos | ............ | G06F 17/30598 707/737 |
| 7,673,234 B2 * | 3/2010 | Kao | .................. | G06F 17/30707 715/255 |
| 7,720,846 B1 * | 5/2010 | Bayliss | ............. | G06F 17/30598 707/736 |
| 8,438,184 B1 * | 5/2013 | Wang | ..................... | H04L 67/02 707/780 |
| 8,589,399 B1 * | 11/2013 | Lee | ................... | G06F 17/30616 707/737 |
| 8,639,695 B1 * | 1/2014 | Spielthenner | ..... | G06F 17/30598 707/737 |
| 8,972,391 B1 * | 3/2015 | McDonnell | ......... | G06F 17/3053 707/727 |
| 8,972,404 B1 * | 3/2015 | Lewis | ................. | G06F 17/3071 707/737 |

(Continued)

OTHER PUBLICATIONS

Ayodele, Taiwo Oladipupo. "Types of Machine Learning Algorithms." (2012) (Year: 2012).*

(Continued)

*Primary Examiner* — William Spieler
(74) *Attorney, Agent, or Firm* — Yee & Associates, P.C.

(57) ABSTRACT

A method for allowing a computer to classify an input containing data. A list of categories is received. A sub list of categories is selected, wherein the sub-list comprises those categories in the list that have corresponding distinct correlation scores above a predetermined value. Input data that tends to over correlate to the classification system is received. A truncated snapshot is generated, the truncated snapshot comprising only attributes from the plurality of input attributes that have corresponding input categories that match categories in the sub-list of categories. The data is classified using the truncated snapshot and the classification system.

20 Claims, 9 Drawing Sheets

(56) References Cited

U.S. PATENT DOCUMENTS

| | | | |
|---|---|---|---|
| 9,009,256 B1* | 4/2015 | DeMorrow | H04L 67/02 709/203 |
| 9,015,152 B1* | 4/2015 | Schogol | G06F 17/30442 707/723 |
| 9,152,694 B1* | 10/2015 | Padidar | G06F 17/30598 |
| 9,311,386 B1* | 4/2016 | Song | G06F 17/30722 |
| 2011/0184656 A1* | 7/2011 | Kenedy | G06Q 40/00 702/19 |
| 2012/0197921 A1* | 8/2012 | Mineno | G06F 17/30622 707/758 |
| 2012/0221562 A1* | 8/2012 | Zhang | G06F 17/3053 707/728 |
| 2013/0091137 A1* | 4/2013 | Aust | G06F 17/30705 707/737 |
| 2013/0097177 A1* | 4/2013 | Fan | G06F 17/30554 707/748 |
| 2014/0025668 A1* | 1/2014 | Lin | G06F 17/30867 707/723 |
| 2014/0297476 A1* | 10/2014 | Wang | G06Q 30/0625 705/26.62 |
| 2014/0317078 A1* | 10/2014 | Gallagher | G06F 17/30867 707/706 |
| 2015/0161216 A1* | 6/2015 | Skiba | H04L 51/32 707/603 |
| 2015/0212976 A1* | 7/2015 | Chattopadhayay | G06F 17/30705 704/9 |
| 2015/0220528 A1* | 8/2015 | Huang | G06F 17/3007 707/728 |
| 2015/0310092 A1* | 10/2015 | Shi | G06F 17/30601 707/738 |
| 2015/0332336 A1* | 11/2015 | Hong | G06F 17/30 705/14.66 |
| 2016/0004764 A1* | 1/2016 | Chakerian | G06F 17/212 707/737 |
| 2016/0012019 A1* | 1/2016 | Bagwell | G06F 17/218 707/738 |
| 2016/0012220 A1* | 1/2016 | Padidar | G06F 17/30598 726/22 |
| 2016/0026720 A1* | 1/2016 | Lehrer | G06Q 10/101 707/710 |
| 2016/0034305 A1* | 2/2016 | Shear | G06F 9/50 707/722 |
| 2016/0110524 A1* | 4/2016 | Short | G06F 19/18 705/2 |

OTHER PUBLICATIONS

"Nearest neighbour classifiers," Wikipedia, the free encyclopedia, dated Mar. 29, 2014, 3 pages. Accessed Jul. 16, 2014, http://en.wikipedia.org/wiki/Nearest_neighbour_classifiers.

"Linear classifier," Wikipedia, the free encyclopedia, dated May 13, 2014, 3 pages. Accessed Jul. 16, 2014, http://en.wikipedia.org/wiki/Linear_classifier.

"Boosting (machine learning)," Wikipedia, the free encyclopedia, dated Jul. 7, 2014, 4 pages. Accessed Jul. 16, 2014, http://en.wikipedia.org/wiki/Boosting_(machine_learning).

"Decision tree learning," Wikipedia, the free encyclopedia, dated Jul. 16, 2014, 8 pages. Accessed Jul. 16, 2014, http://en.wikipedia.org/wiki/Decision_tree_learning.

"Margin classifier," Wikipedia, the free encyclopedia, dated May 23, 2014, 2 pages. Accessed Jul. 16, 2014, http://en.wikipedia.org/wiki/Margin_classifier.

* cited by examiner

| Attribute Category | Count of Score |
|---|---|
| indicator_sensor:[DX204]right_tail_flap_sensor | 149 |
| indicator_sensor:[EX236]extended_rear_right_flap_sensor | 149 |
| indicator_sensor:[DX202]left_tail_flap_sensor | 140 |
| indicator_sensor:[EX220]extended_right_tail_flap_sensor | 139 |
| indicator_sensor:[EX211]extended_left_tail_flap_sensor | 138 |
| indicator_sensor:[EX235]extended_rear_left_tail_flap_sensor | 138 |
| indicator_sensor:[DX211]left_center_tail_flap_sensor | 132 |
| indicator_sensor:[MN112]main_landing_gear_sensor | 132 |
| indicator_sensor:[LG452]left_landing_gear_sensor | 132 |
| indicator_sensor:[DX122]left_outward_tail_flap_sensor | 128 |
| indicator_sensor:[IN002]right_inner_tail_flap_sensor | 127 |
| indicator_sensor:[FS110]right_extended_wheel_guard_sensor | 115 |
| indicator_sensor:[DX314]extended_rear_left_flap_sensor | 114 |
| indicator_sensor:[EX112]rear_left_landing_gear_sensor | 111 |
| indicator_sensor:[FS110]right_extended_wheel_guard_sensor | 110 |
| indicator_sensor:[FS121]left_extended_wheel_guard_sensor | 110 |
| indicator_sensor:[WH210]center_extended_wheel_sensor | 109 |
| indicator_sensor:[MN102]main_center_fuel_tank_sensor | 99 |
| ○○○ | ○○○ |

| Attribute Category | Count of Score |
|---|---|
| indicator_sensor:[DX204]right_tail_flap_sensor | 149 |
| indicator_sensor:[EX236]extended_rear_right_flap_sensor | 149 |
| indicator_sensor:[DX202]left_tail_flap_sensor | 140 |
| indicator_sensor:[EX220]extended_right_tail_flap_sensor | 139 |
| indicator_sensor:[EX211]extended_left_tail_flap_sensor | 138 |
| indicator_sensor:[EX235]extended_rear_left_tail_flap_sensor | 138 |
| indicator_sensor:[DX211]left_center_tail_flap_sensor | 132 |
| indicator_sensor:[MN112]main_landing_gear_sensor | 132 |
| indicator_sensor:[LG452]left_landing_gear_sensor | 132 |
| indicator_sensor:[DX122]left_outward_tail_flap_sensor | 128 |
| indicator_sensor:[IN002]right_inner_tail_flap_sensor | 127 |
| indicator_sensor:[FS110]right_extended_wheel_guard_sensor | 115 |
| ○○○ | ○○○ |

FIG. 6

700 http://flight_system.boeing.com:8080/ws/spaces/flight/connections?q=(_indicator_sensor:[DX204]right_tail_flap_sensor:_moderately_bubbly%20_indicator_sensor:[EX236]extended_rear_right_flap_sensor:_moderately_lively%20_indicator_sensor:[EX220]extended_right_tail_flap_sensor:_mode bubbly%20_indicator_sensor:[EX211]extended_rear_tail_flap_sensor:_moderately_lively_to_fairly_vibrant%20_indicator_sensor:[DX204]right_tail_flap_sensor:_extremely_lively_to_fairly_bubbly%20_indicator_sensor:[IN002]right_inner_tail_flap_sensor:_lively_to_fairly_vibrant%20_indicat:[LG452]left_landing_gear_sensor:_moderately_vibrant_to_moderately_bubbly%20_indicator_se[EX235]extended_rear_left_tail_flap_sensor:_moderately_lively_to_extremely_bubbly%20_indicansor:[DX204]right_tail_flap_sensor:_moderately_vibrant_to_extremely_bubby%20_indicator_sen

DEVICES AND METHOD FOR SCORING DATA TO QUICKLY IDENTIFY RELEVANT ATTRIBUTES FOR INSTANT CLASSIFICATION

BACKGROUND INFORMATION

1. Field

The present disclosure relates generally to data management and, in particular, to allowing a classification system to more quickly make a classification determination from an input data set.

2. Background

Classification systems receive data, analyze the data, and then assign the data to a known set, or classifier, where one or more elements of the data correspond to one or more elements of the classifier. For example, in a human motion detection classification system, sensors may measure actions of a human. These sensors may input their data to a classification system, which then analyze the data to determine which action the data most resembles. Examples of such a classification may be to classify whether the human sits, stands, walks, holds a phone, bends over, or takes some other action. In another example, a classification system could analyze the input from sensors on an aircraft and then classify some aspect of the aircraft's operation, such as whether the aircraft executes a turn or whether flaps have been deployed.

However, in some cases, the amount of input data may overwhelm a classification system. By "overwhelm" what is meant is that enough input data is presented, or certain types of data are present, that the system cannot produce—or has a substantial chance of failing to produce—a classification within a desired period of time to a desired degree of accuracy. The term "overwhelming amount of data" also includes a situation where a classification system or computer system could handle a volume of data, but a network transmitting the data could not. Thus, methods and devices are desirable that provide a method for obtaining relevant information to classify new observations within data sets, without sacrificing speed and accuracy.

SUMMARY

The illustrative embodiments provide for a method for allowing a computer to classify an input containing data. The method includes receiving, by the computer, a list of categories from a classification system stored at the computer. Each category in the list is assigned a corresponding distinct correlation score that indicates a relevance of a particular category to a particular classification. The method further includes selecting, by the computer, a sub-list of categories. The sub-list comprises those categories in the list that have corresponding distinct correlation scores above a predetermined value. The sub-list of categories comprises less than all of the categories in the list. The method further includes receiving, by the computer, the input containing the data. The data is organized by a plurality of input attributes. Each input attribute has a corresponding input category and a corresponding input value, such that the plurality of input attributes has a plurality of input categories and a corresponding plurality of input values. At least some of the plurality of input attributes has corresponding input categories that match at least some of a plurality of categories of the list of categories. The plurality of input attributes tends to over-correlate with respect to the classification system, the tendency to over-correlate occurring as a result of an amount of the data. The method also includes generating, by the computer, a truncated snapshot, the truncated snapshot comprising only attributes from the plurality of input attributes that have the corresponding input categories that match categories in the sub-list of categories. The method further includes classifying the data, by the computer, using the truncated snapshot and the classification system.

The illustrative embodiments also provide for a data processing system. The data processing system includes a processor, a bus connected to the processor, and a non-transitory computer readable storage medium connected to the bus. The non-transitory computer readable storage medium stores a computer program product which, when executed by the processor, performs a computer implemented method for allowing a computer to classify an input containing data. The computer program product includes computer usable program code for receiving a list of categories from a classification system stored at the computer. Each category in the list is assigned a corresponding distinct correlation score that indicates a relevance of a particular category to a particular classification. The computer program product includes computer usable program code for selecting a sub-list of categories. The sub-list comprises those categories in the list that have corresponding distinct correlation scores above a predetermined value, and wherein the sub-list of categories comprises less than all of the categories in the list. The computer program product includes computer usable program code for receiving the input containing the data. The data is organized by a plurality of input attributes, wherein each input attribute has a corresponding input category and a corresponding input value, such that the plurality of input attributes has a plurality of input categories and a corresponding plurality of input values. At least some of the plurality of input attributes has corresponding input categories that match at least some of a plurality of categories of the list. The plurality of input attributes tends to over-correlate with respect to the classification system, the tendency to over-correlate occurring as a result of an amount of the data. The computer program product includes computer usable program code for generating a truncated snapshot, the truncated snapshot comprising only attributes from the plurality of input attributes that have corresponding input categories that match categories in the sub-list of categories. The computer program product includes computer usable program code for classifying the data using the truncated snapshot and the classification system.

The illustrative embodiments also provide for a system configured to classify an input containing data. The system includes a tangible input device configured to receive a list of categories from a classification system stored at the computer. Each category in the list is assigned a corresponding distinct correlation score that indicates a relevance of a particular category to a particular classification. The system includes a selection device configured to select a sub-list of categories. The sub-list comprises those categories in the list that have corresponding distinct correlation scores above a predetermined value. The sub-list of categories comprises less than all of the categories in the list. The system includes a data input device configured to receive input, the input containing data. The data is organized by a plurality of input attributes. Each input attribute has a corresponding input category and a corresponding input value, such that the plurality of input attributes has a plurality of input categories and a corresponding plurality of input values. At least some of the plurality of input attributes has corresponding input categories that match at least some of a plurality of categories of the list. The plurality of input attributes tends to over-correlate with respect to the classification system, the tendency to over-correlate occurring as a result of an amount of the data. The system includes a snapshot generator configured to generate a truncated snapshot, the truncated snapshot comprising only attributes from the plurality of input attributes that have corresponding input categories that match categories in the sub-list of categories. The system includes a classifier configured to classify the data using the truncated snapshot and the classification system.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 5 illustrates an example of accumulated scored categories, in accordance with an illustrative embodiment;

FIG. 6 illustrates an example of selecting stored categories, in accordance with an illustrative embodiment;

FIG. 7 illustrates an example of a truncated snapshot of improved data used to perform an instant classification, in accordance with an illustrative embodiment;

DETAILED DESCRIPTION

Figure 1:
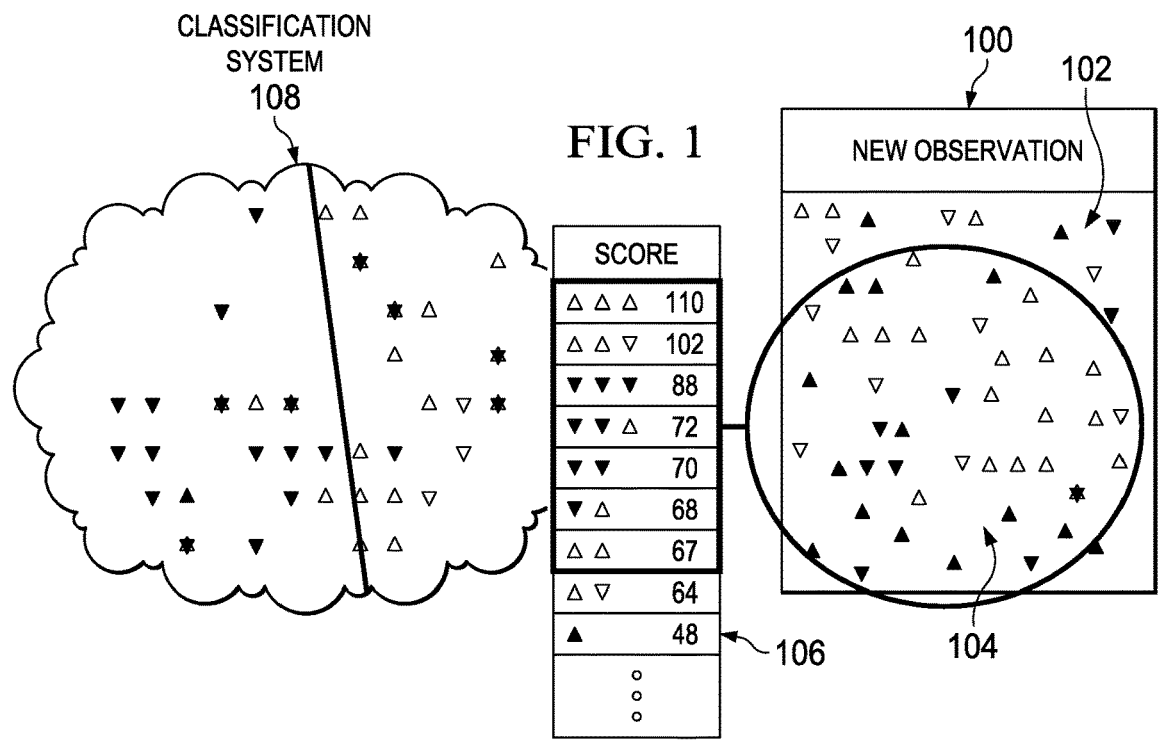
FIG. 1 illustrates an example of making a classification based on received input data, in accordance with an illustrative embodiment.

The illustrative embodiments provide several useful functions. For example, the illustrative embodiments recognize and take into account that a classification system may receive an overwhelming amount of data. As used herein, the term "overwhelming amount of data" is defined as either an amount of input data or a type of data that results in the classification system being unable to generate a classification from the input data within a desirable period of time to a desired degree of accuracy, or that results in the classification system having a substantial chance of failing to produce a classification. The terms "overwhelming amount of data" and "overwhelming data" are synonymous. The illustrative embodiments recognize and take into account that not all attributes in a set of input data are needed to generate an accurate classification, but that a partial list of the attributes for an observation will be sufficient to generate an accurate classification. Techniques for generating the partial list are described further below.

The illustrative embodiments recognize and take into account that large input data sets tend to over-correlate. As used herein, the term "over-correlate" is defined as a given attribute value tending to correlate to other attribute values in a data set when the data set is compared to a classification system simply because of the size of the data set. This effect occurs because the likelihood of correlation among attribute values increases as the data set becomes larger. The illustrative embodiments address the problem of over-correlation by identifying the attributes that are most relevant, as described further below.

The illustrative embodiments may address a technical problem in that a computer may not have the physical capability of performing a classification quickly enough, or at all, based on input that is an overwhelming amount of data. The illustrative embodiments solve this technical problem by evaluating only the most relevant attributes, thereby increasing the speed of operation of the computer, or by possibly allowing the classification to be performed at all. Thus, the illustrative embodiments have a technical character or contribute to it, as a technical problem is solved by using technical means. Additionally, a technical interaction occurs between the computer and the data that allow the data to be processed in a desirable manner. An additional technical effect is that the illustrative embodiments may prevent a computer system or a network from crashing, requiring re-boot which is costly in terms of time and possibly money. The illustrative embodiments accomplish this effect by identifying the most relevant attributes, such that the computer system or network is less likely to crash when the computer system generates the classification based on the input data. In some illustrative embodiments, a least number of attributes will be identified to be relevant. In most cases, at least some attributes identified as less relevant will be identified and not used in the classification.

Thus, the illustrative embodiments provide methods and devices to quickly collect the best and most relevant attributes for a new observation to use with respect to a classification scheme. For example, suppose an airborne system collected sensor data and was tasked to compare that data with previous flights to classify incoming data in real time. As used herein, the term "real time" is defined as a first time increment that is shorter than or the same as a second time increment defined with respect to the speed at which events are occurring. Because of the vast amounts of data, determining which of the data's attributes would be the best to compare would be difficult to perform in real time. If the computer system attempted to perform a classification using all the available attributes, the comparison could take too long, or it might overwhelm the system and cause it to fail. As a result, the illustrative embodiments provide techniques for obtaining relevant information useful to classify new observations within large datasets without sacrificing speed and accuracy.

FIG. 1 illustrates an example of making a classification based on received input data, in accordance with an illustrative embodiment. New observation 100 includes data 102. Subset of data 104 includes data points that have a relevance score above a certain value, sixty-seven in score list 106 shown in FIG. 1. Classification system 108 generated subset of data 104 using score list 106. Classification system 108 classifies new observation 100 based on subset of data 104.

As used herein, the term "classification system" refers to a schema useful for classifying incoming data. For example, classification system 108 may specify that if new observation 100 falls within a given range, then new observation 100 is to be interpreted as a specific movement of an object being monitored. In this manner, the incoming data is classified. A classification system is implemented using a computer system, application specific integrated circuit, or software executed by a processor.

Likewise, the term "classification" is defined as the task of identifying to which of a set of categories a new observation belongs on the basis of a training set of data containing prior observations or definitions whose category membership is known.

Thus, the illustrative embodiments use information already known by classification system 108 to help it classify new observations. The illustrative embodiments provide techniques for instructing a computer system to generate score list 106 which includes the best attributes for new observation 100 by using the accumulated score of each attribute's category from the known information already collected. Then, the computer system orders these scored categories and allows the user, or system, to select the top candidates within subset of data 104 to include within an instant classification. As used herein, the term "instant classification" is defined as a classification performed by a computer system in real time based on attributes that are gathered in real time. An "instant classification" is performed on a "snapshot" of data. A "snapshot" of data is a set of data obtained in real time. For example, a "snapshot" of data could be subset of data 104, and classification system 108 may perform an instant classification on subset of data 104. Note that data 102, and thus subset of data 104, comes from outside of classification system 108. Therefore, as a result, classification system 108 would not automatically know or be able to assign which attributes within data 102 are the best to use. In other words, while classification system 108 could create score list 106 without more procedures or data, classification system 108 could not generate score list 106 to identify the most relevant attributes, especially for large data sets which tend to over correlate. Over correlation is described further below.

As used herein, the term "attribute" is defined as a characteristic used to describe an aspect of an object. As used herein, an attribute is separated into a category and its corresponding value. For example, the color yellow is an attribute of a lemon; the attribute's category is "color" and its corresponding value is "yellow". Stated differently, the lemon has an attribute having a category of "color" whose corresponding value is "yellow." Thus, the lemon has a "color" of "yellow," constituting an attribute of the lemon. Similarly, the lemon could have a "taste" (category) of "sour" (corresponding value of the category), constituting another attribute of the lemon. Thus, an object may have many attributes. Additionally, abstract concepts may also have attributes.

Figure 2:
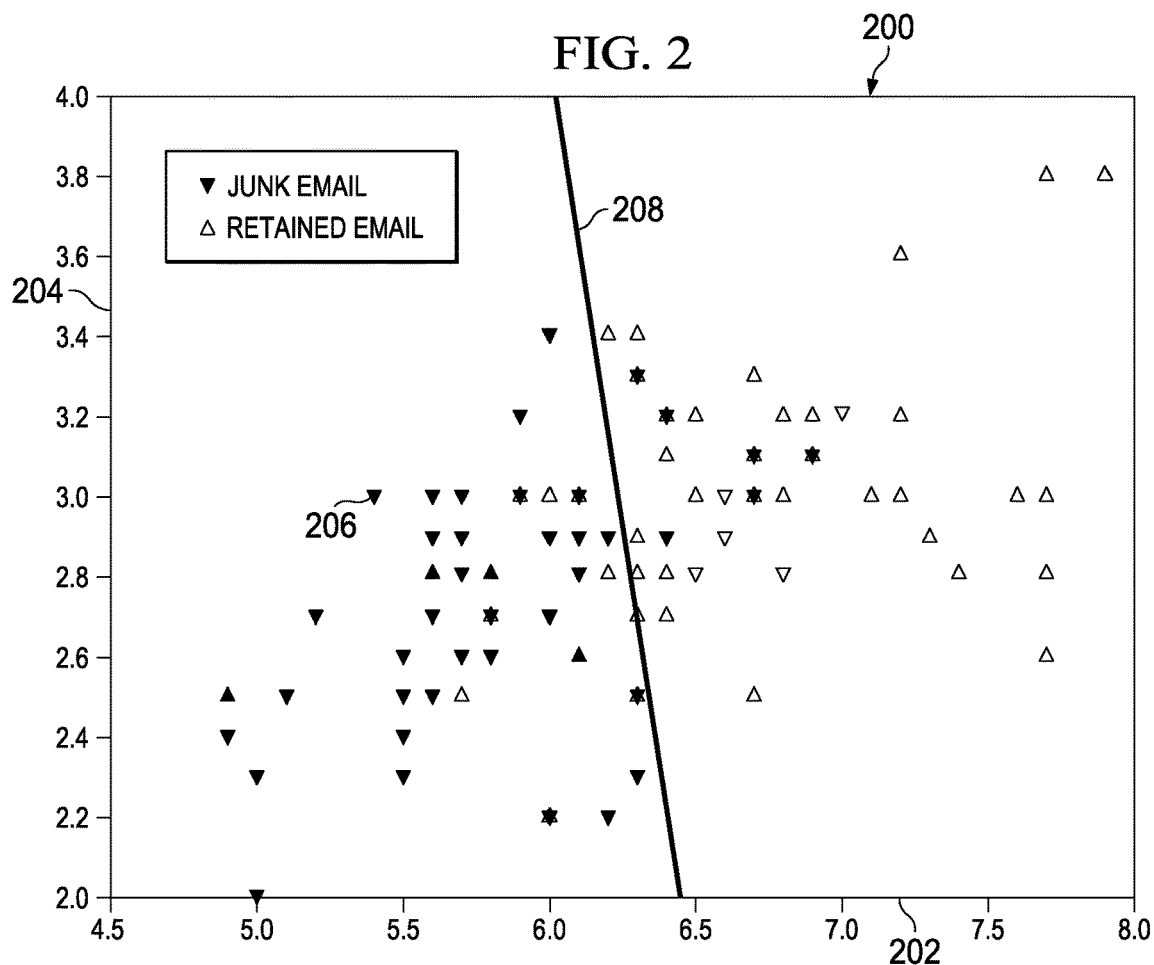
FIG. 2 illustrates a specific example of making a classification based on received input data, in accordance with an illustrative embodiment.

FIG. 2 illustrates a specific example of making a classification based on received input data, in accordance with an illustrative embodiment. Classification system 200 is a specific example of classification system 108 of FIG. 1. Classification system 200 is an email classification system for identifying email as either junk or retained.

Classification system 200 is based on a combined score based on two different measurements of incoming email. These two different measurements are shown as the numbers along axis 202 and axis 204. A given email is assigned a score along both axes, resulting in a point in Cartesian coordinates, such as, for example, point 206.

Prior to receipt of the email that results in point 206, classification system 200 is trained either by observing past classifications of emails that a user has identified as "junk" or "retained," or by having pre-defined data that instructs classification system 200 to identify a given email as either "junk" or "retained." In this particular illustrative embodiment, training of classification system 200 results in line 208. Points to the left of line 208 are identified as "junk" emails and points to the right of line 208 are identified as "retained" emails. Thus, in this illustrative embodiment, the email that results in point 206 is classified as "junk" email, as this point lies to the left of line 208.

Thus, a classification may be characterized as the ability to identify to which group of objects a new observation belongs using a known set of characteristics to compare against. The pre-identified characteristics are used to "train" the system, so the new observation either identifies with one set or the other.

For example, classification system 200 classifies incoming email, a new observation, as either retained or junk email based on certain characteristics. The characteristics that make up the outcome, "retained" or "junk," are already known. For example, retained email typically comes from a recognized sender. Depending on the number of common matches, classification system 200 will know where to classify the incoming email.

In the terminology of machine learning, a classification system, such as classification system 200, is considered an instance of supervised learning. Supervised learning is learning where a training set of correctly-identified observations is available. The corresponding unsupervised procedure is known as clustering, or cluster analysis, and involves grouping data into categories based on some measure of inherent similarity, such as, for example, the distance between instances (considered as vectors in a multi-dimensional vector space).

Figure 3:
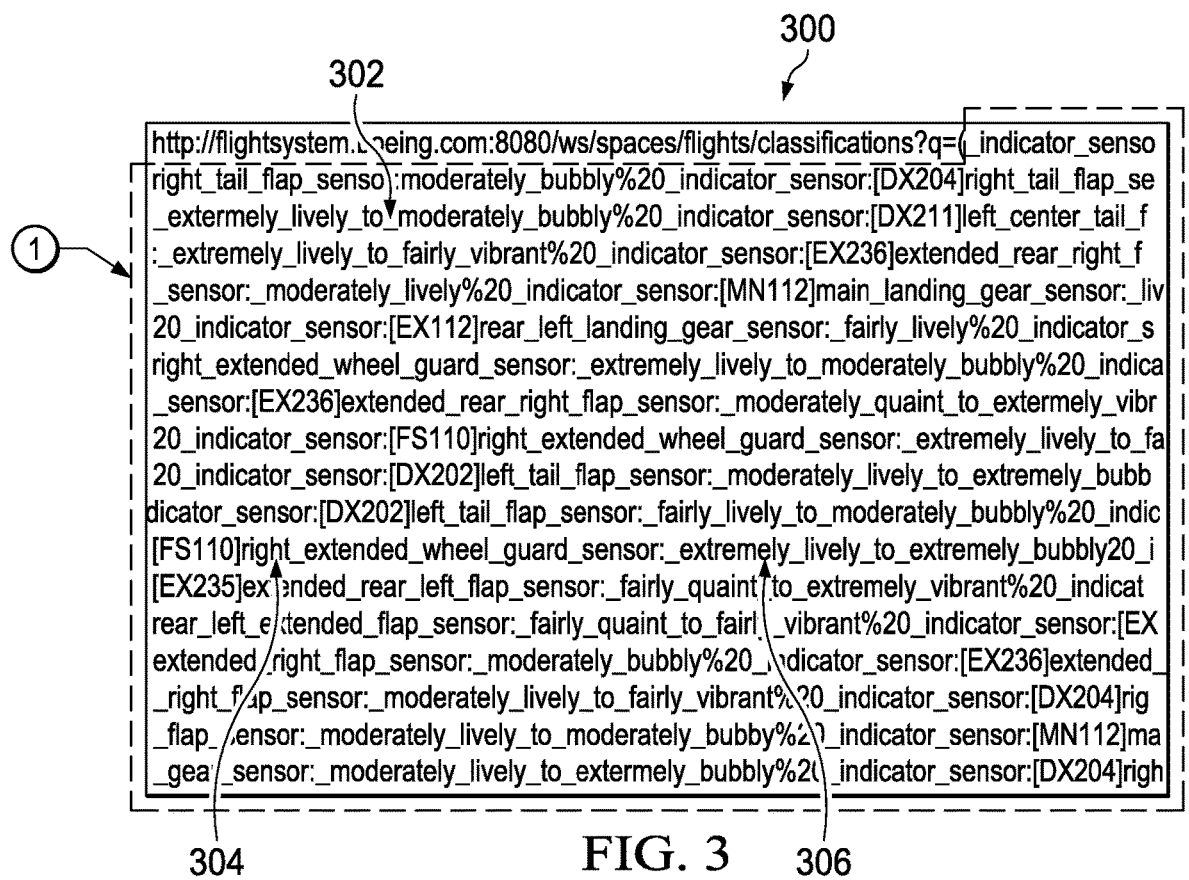
FIG. 3 illustrates an example of a snapshot of data to be used to perform an instant classification within an associative memory, in accordance with an illustrative embodiment.

FIG. 3 illustrates an example of a snapshot of data to be used to perform an instant classification within an associative memory, in accordance with an illustrative embodiment. Again, the term "instant classification" is defined as a classification performed by a computer system in real time based on attributes that are gathered in real time. Likewise, a "snapshot" of data is a set of data obtained in real time. Thus, a computer may generate an instant classification of the set of data in snapshot 300. This instant classification may be performed using classification system 108 of FIG. 1 or classification system 200 of FIG. 2.

Snapshot 300 contains data 302. Data 302 may represent an overwhelming amount of data. Again, an overwhelming amount of data is defined as either an amount of input data or a type of data that results in the classification system being unable to generate a classification from the input data within a desirable period of time to a desired degree of accuracy, or that results in the classification system having a substantial chance of failing to produce a classification. The term "overwhelming amount of data" also includes a situation where a classification system or computer system could handle a volume of data, but a network transmitting the data could not.

In the illustrative embodiment shown in FIG. 3, data 302 relates to measurements taken by sensors on an aircraft. Each attribute relates to a category, such as category 304, and has a corresponding value, such as value 306. Note that the attribute value names shown in FIG. 3 do not relate to real measurements of aircraft sensors, but could be replaced by real values.

Again, a snapshot, such as snapshot 300, may be the instrument one uses to initiate a real time response from a classification system, given a new observation measured in real time. Typically, the snapshot uses data unknown to the classification system and is taken from outside the classification system. The composition of snapshot 300 may vary, and may depend on how the underlying classification system is implemented. For example, snapshot 300 shown in FIG. 3 is an example of a snapshot used with respect to an associative memory. However, the illustrative embodiments are not limited to associative memories or classification systems implemented using associative memories, but may be used with respect to any classification system which faces an overwhelming amount of data.

As shown in FIG. 3, data 302, or attributes contained within the snapshot of the new observation, are assembled from measurements taken from sensors, but the illustrative embodiments are not limited to aircraft sensors. Data 302 is typically substantial and diverse. As a result of the size and complexity of data 302, these attributes can grow quickly and become unmanageable, either by the classification system, by the network, or both. This situation may create one or more problems when trying to ascertain an accurate classification based on data 302. Specifically, this situation may reduce the speed of classification below a desired level, or even cause a computer system or software to crash when attempting to process the overwhelming amount of data. Other problems may also arise.

The illustrative embodiments address these problems by providing methods and devices for selecting a subset of data that is most relevant, but that is more manageable by the computer system or the software. The illustrative embodiments describe the methods and devices for obtaining a subset of attributes for a classification of a new observation, rather than the basic licensed core technologies one uses to perform a classification. The illustrative embodiments describe the ability to classify an observation using an associative memory. However, this classification could be accomplished with any sort of classification mechanism and is not limited to only the use of an associative memory. The illustrative embodiments do not necessarily attempt to define how an attribute is scored. The illustrative embodiments may assume that the underlying classification system has the ability to rank or score individual attributes, as they relate to other attributes and/or the classification's outcome. The illustrative embodiments do not preclude results with low scores. Thus, it is possible to obtain an attribute value which did not have a high score. The illustrative embodiments do not specify when the system needs to generate the scored information. Because the illustrative embodiments are independent of the classification system being used, a snapshot only needs to be available when an instant classification occurs.

Figure 4:
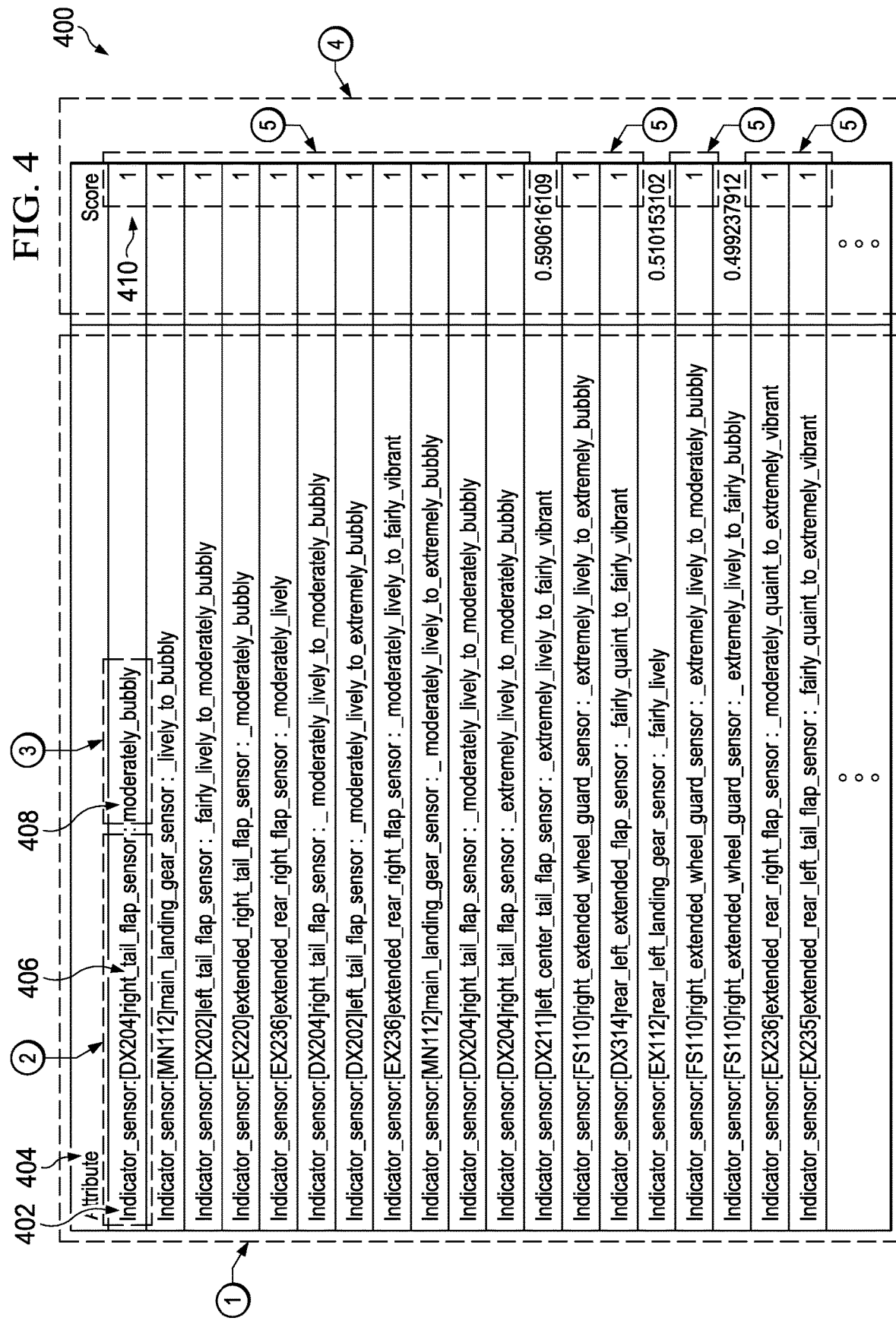
FIG. 4 illustrates an example of scoring data, in accordance with an illustrative embodiment.

FIG. 4 illustrates an example of scoring data, in accordance with an illustrative embodiment. The scoring system is assumed as known to those of ordinary skill.

Through whatever means, the scoring system identifies a correlation between a particular attribute and that attribute's importance to classifying the snapshot. For example, a score of "1" indicates that a particular attribute is very important for an accurate classification. Using FIG. 4 as an example, attribute 402 has a score of "1", which reflects a very high importance of attribute 402 when classifying snapshot 300 of FIG. 3. Thus, attribute 402 will be considered when classifying this snapshot, such as, for example, classifying whether snapshot 300 is classified as a desirable or an undesirable orientation of a wing. Likewise, score of "0.5" may indicate that a particular attribute is of moderate importance for an accurate classification. In general, the lower the score, the less important the attribute is to making an accurate classification, though other scoring schemas could be used.

Scored results 400 represent an example of the tendency of an overwhelming amount of data to over-correlate. Again, the term "over-correlate" is defined as a given attribute value tending to correlate to other attribute values in a data set when the data set is compared to a classification system simply because of the size of the data set. Thus, for example, many attributes listed in scored results 400 have a score of "1". This result is undesirable as the generated subset of data used to classify snapshot 300 of FIG. 3 may remain undesirably large, and may still be an overwhelming amount of data.

However, again, a purpose of the illustrative embodiments is to quickly generate a list of relevant attributes to use in a classification of a new observation. When a new observation, or snapshot, is introduced to a classification system, the new observation typically contains a series of attributes the classification system uses to classify the new observation or snapshot. The classification system compares the attributes in the snapshot with the attributes of known observations and/or with predetermined attribute values. The classification system uses the comparison to determine which of the known observations or predetermined values most closely matches the corresponding attribute values of the snapshot and/or new observation. The snapshot is then classified as being in the same category as the category to which the known observations and/or predetermined values belong.

Consequently, determining which attributes from the snapshot or new observation will be used to perform the comparison is a step of the illustrative embodiments. If the selected attributes are not specific or descriptive enough, the resulting classification may be incorrect. In order to avoid this undesirable result, a combination of attributes should be selected that are truly relevant enough to the desired classification.

Under these circumstances, one alternative for selecting the correct combination of relevant attributes is to have the classification system itself determine which attributes are the best to use. A classification system should have the ability to rank or score the data within it. Typically every attribute, that is a category-value pair, should have a score as to how it relates to other attributes and/or the classification's outcome. For example, an email classification system, as described earlier, would rank the attribute "sender" highly. On the other hand, the attribute "date" would be ranked lower, as the date may have little correlation to the classification of the email.

Nonetheless, even using the classification system to select the new observation's attributes has limitations. Attribute values in large datasets tend to over-correlate, regardless of their contribution. Thus, large datasets have a tendency to obscure the relevant attributes while blending all or most attributes together.

For example, suppose a large dataset is used that contains aircraft sensor data to classify distinctions between a desirable aircraft position and a less desirable aircraft position, by inputting data such as that shown in FIG. 3 into a classification system. FIG. 4 represents the scored results one might expect to see when this data is analyzed by the classification system. Each attribute in set of attributes 404 (in the box labeled "1") includes a category, such as category 406 (in the box labeled as "2"). Each attribute in set of attributes 404 also includes a category value, such as category value 408 (in the box labeled as "3"). Each attribute in set of attributes 404 also includes a corresponding score, such as score 410 (in the box labeled as "4").

Because the data is so prolific, most of the attributes scored very highly (in the box labeled as "5"), even though the attributes' exact correlation to the classification's outcome maybe questionable. This result may make difficult identifying where the real distinctions are. In fact, a vast majority of attributes scored a "1", as shown in FIG. 4.

Note that the data in scored results 400 may extend past what is shown in the page. For example, in a large dataset, possibly 11,168 attributes out of 15,338 attributes (73%) have a score of "1". This result suggests that most of the attributes are not very informative and, as a result, the ensuing classification might not be very informative.

Additionally, or alternatively, because so many attributes scored very highly, the resulting classification may take an undesirably long time to produce. In other words, another problem may be the sheer number of attributes generated by the classification system. Even if there was a clean distribution, the volume of attribute values alone could be enough to overwhelm a system or network.

FIG. 5 illustrates an example of accumulated scored categories, in accordance with an illustrative embodiment. Scored results 500 represent a result of an alternative scoring system relative to the scoring system that produced scored results 400 shown in FIG. 4. Scored results 500 are based on snapshot 300 shown in FIG. 3. Scored results 500 show an accumulation of scored categories, as opposed to the category-value pairs of attributes.

A better way of selecting the relevant attributes, relative to using the classification system's scoring system, would be to focus on just the categories. This technique lessens the amount of distinctions, while retaining the core relevance. For example, in the sensor classification example provided above, there are 15,338 distinct attributes in snapshot 300 of FIG. 3; however, there are only 190 distinct categories. Thus, each category could contain many attribute values and, accordingly, could be assigned many scores.

If the accumulated categories with the highest score count are used, the resulting list of attributes will more accurately reflect the distinctions the classification system is trying to draw upon. FIG. 5 illustrates an example of this technique. Scored results 500 uses the same data as that shown in FIG. 4, except scored results 500 only shows an accumulated count of the highest scored categories.

The resulting list, list of scores 502, is a descending ordered grouping of distinct categories. Categories at the top of the list have the most peculiarities among them, as they correlate to the classified outcome, which gives them a high score. The "score" is actually an accumulation of all the categories which scored a one, the highest score. In the aircraft sensor classification example described above, it appears that categories containing the "tail flap" description have the highest score. These categories are labeled as "1" in FIG. 5, a specific example of which is shown at arrow 504.

FIG. 6 illustrates an example of selecting stored categories, in accordance with an illustrative embodiment. Scored results 600 is a subset of scored results 500 of FIG. 5.

Using the accumulated scored categories, as shown in FIG. 6, the illustrative embodiments allow the user, or the computer system, to select which attribute categories to include within the instant classification of the new observation. The user or system might make their decision based on the score, which indicates these categories might be highly influential on the classification's outcome. In this illustrative embodiment, group of categories 602 (shown in the box labeled as "1" in FIG. 6) is selected because each of the categories has a cumulative score that is above a threshold value. In this illustrative embodiment, the threshold value is a cumulative score of 127, though the threshold value may be any desired value. The threshold value may be set by the user or the computer system, or may be determined based on a drop-off value, as described below.

For example, the drop in the score between the last "tail flap" attribute, attribute category 604, and the "wheel guard" attribute, attribute category 606, has a value of 12 (the difference between 127 and 115). This drop-off is shown at box 2 608. Similar drop off values between successive categories above a score of 127 are at most 9 (the difference between score 610 and score 612). A user or computer system could specify that once the drop off value reaches a predetermined value, such as for example greater than or equal to ten, then succeeding categories will not be considered. This predetermined value may replace the threshold score, described above, or may be used to determine the threshold score, described above.

In other words, the categories below a threshold score are less likely to influence the classification's outcome. For that reason, only categories above the threshold score will be considered. In this manner, group of categories 602 may be selected for use in performing a classification. The threshold itself may be determined by comparing succeeding categories' scores, until the difference between two succeeding categories' scores exceeds a predetermined value. Once this predetermined value is reached, the category with the higher score (relative to the next less relevant score) is the last category in group of categories 602.

FIG. 7 illustrates an example of a truncated snapshot of improved data used to perform an instant classification, in accordance with an illustrative embodiment. Truncated snapshot 700 is a snapshot derived from, for example, snapshot 300 of FIG. 3. Truncated snapshot 700 includes all attributes which have a category that is included in group of categories 602, selected as described above with respect to FIG. 6. A classification system, executed by or embodied as a computer system or software, will then use truncated snapshot 700 to classify snapshot 300.

In other words, once group of categories 602 of FIG. 6 is created, only the attributes for group of categories 602 should be included for the instant classification. FIG. 7 illustrates this principle in the form of truncated snapshot 700. In this case, using attributes whose categories contain "tail flap" will probably yield the best classification results. Thus, only the categories shown at each instance of box "1" shown in FIG. 7 are included within the truncated snapshot of the original snapshot or new observation. This result may dramatically reduce the number of attributes that the classification system has to process, while still using the most relevant categories, thereby increasing the speed of classification while simultaneously maintaining a desirable level of accuracy of classification. In some cases, the accuracy of classification may be increased, as well as made faster, for cases in which over-correlation of data would lead to reduced accuracy of classification when the full set of attributes in the original snapshot is processed.

Figure 8:
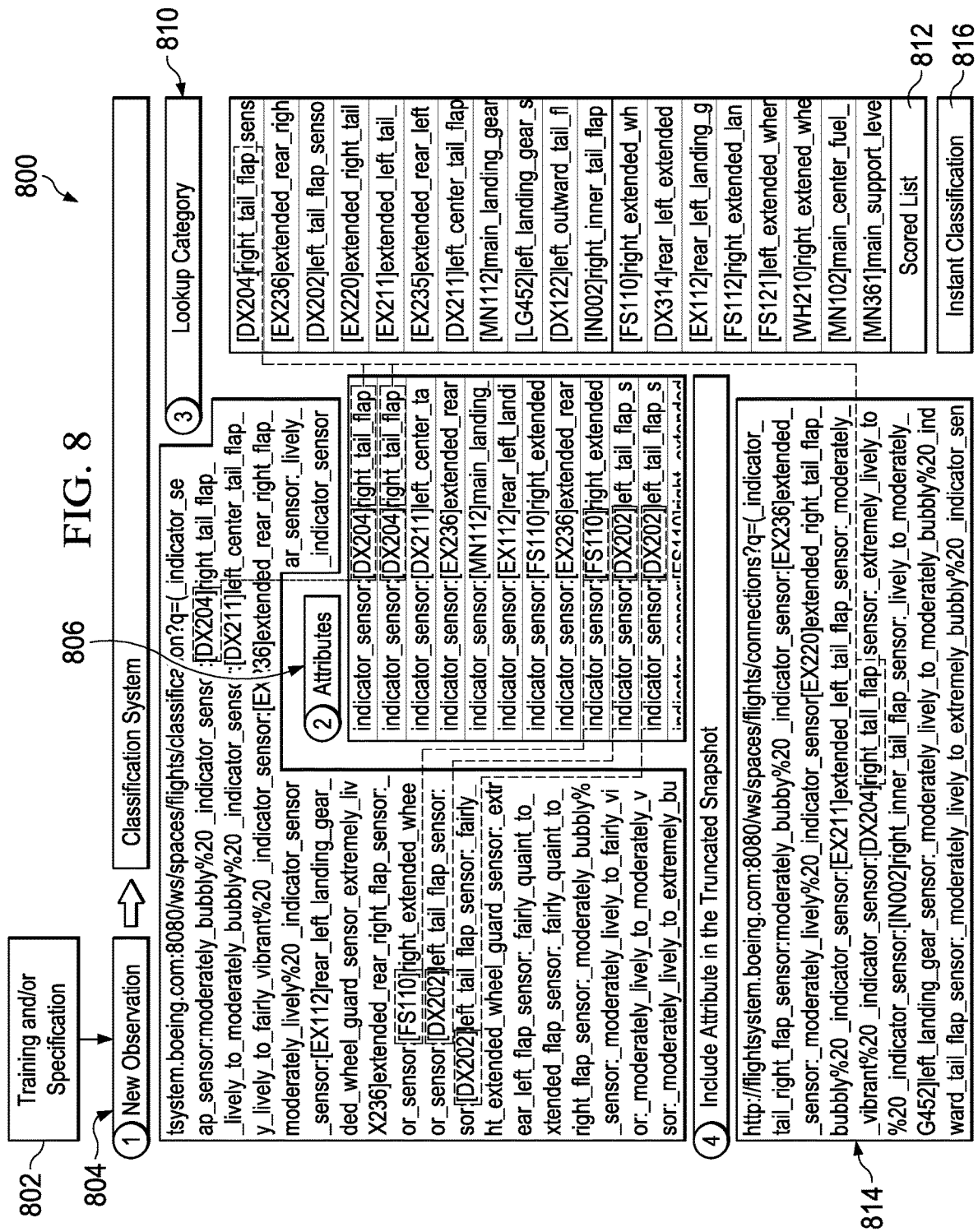
FIG. 8 illustrates an overview of a classification procedure, in accordance with an illustrative embodiment.

FIG. 8 illustrates an overview of a classification procedure, in accordance with an illustrative embodiment. FIG. 8 illustrates set of procedures 800 that are described in detail with respect to FIG. 5 through FIG. 7 that lead to a classification system classifying an original snapshot (new observation) using a truncated snapshot, such as truncated snapshot 700 of FIG. 7.

Initially, at operation 802, a user could train the classification system (which could be an associative memory, or some other hardware or software) using data collected from known observations. For example, aircraft sensor data from transpired flights having known results could serve as an example of what sensor readings correspond to a particular wing position. Alternatively, such training data could be specified by a user, produced from the results of simulation, or provided in some other manner. Each attribute would be labeled or classified accordingly.

First, the classification system is trained (operation 802). Training may be performed in a manner described above. When a new observation is introduced (operation 804), the new observation's attributes are identified (operation 806). Then, the corresponding categories in the data are looked-up (operation 810) within the scored list (operation 812).

Initially, scoring the data could involve two sub-steps at operation 802. First, the classification system's own ability to generate scores could be used to internally score the categories. Second, once scored, an accumulated count of the highest scored categories are created and stored in an ordered list at operation 812. Thus, operation 802 occurs before the classification takes place in order to create the scored list indicated at operation 812 as shown in FIG. 8.

Based on a threshold category score value, as determined by the procedure described with respect to FIG. 6, a group of categories is selected. Then, only attributes in that group of categories are included in the truncated snapshot (operation 814). The classification system then classifies the snapshot using only the truncated snapshot (operation 816).

This procedure may be stated differently, referring to the circled numbers as follows. When a new observation or snapshot (box "1") is introduced to a classification system, the system cycles through all of its attributes (box "2") and looks up each one's category (box "3") to see if the category is in the scored list. If the attribute category is in the scored list, then the system includes the attribute (box "4") within the truncated snapshot. The instant classification (operation 816) is then performed using the truncated snapshot generated at operation 814. Note that training and subsequent scoring at operation 802 would have been performed prior to generation of the snapshot at operation 814 or performance of the instant classification at operation 816. Specifically, the scored list is typically created using the training data prior to receipt of the new observation (the snapshot). However, the scored list may be created after receiving the snapshot, if desired, as the scored list is created independent of the new observation (the snapshot).

As indicated above, the illustrative embodiments are not limited to classification systems that include an associative memory. The illustrative embodiments may be used with any classification system in which data includes attributes having categories and values, or in which data may be parsed to have categories and values. Thus, the illustrative embodiments may be applicable to any company, government, or organization that desires to analyze large volumes of unformatted data quickly. In particular, the illustrative embodiments may be particularly suited towards analyzing data which is difficult to understand without first processing the data. Such data might include, for example, sensor or transmitter data.

The illustrative embodiments may provide a useful way of scoring data to identify relevant attributes which one can later include in an instant classification. Thus, the illustrative embodiments do not necessarily rely on the classification system to provide a scoring system, as described above. The illustrative embodiments are useful for evaluating large amounts of data in real time. The illustrative embodiments may be able to provide meaningful results quickly when using data that is otherwise difficult to understand, such as sensor data. The illustrative embodiments may provide an effective way to classify complex data without having to deeply analyze the data first, which in turn may realize a cost savings.

In a specific non-limiting example, the illustrative embodiments could be used when processing complicated data gathered from sensors on or within aircraft in order to aid in flying the aircraft, maintaining the aircraft, or otherwise operating the aircraft. The illustrative embodiments may be used to analyze sensor data generated during the test trials of these and other products. The illustrative embodiments could be used as a part of a sensor toolkit, as the illustrative embodiments may provide an effective way to analyze large amounts of complicated data. The illustrative embodiments may be used to monitor the movement of a human and then classify the movement as desirable or undesirable in a workplace or therapeutic environment. Thus, the illustrative embodiments are not necessarily limited to the examples provided above, and the claims are not necessarily limited by the examples described herein.

Figure 9:
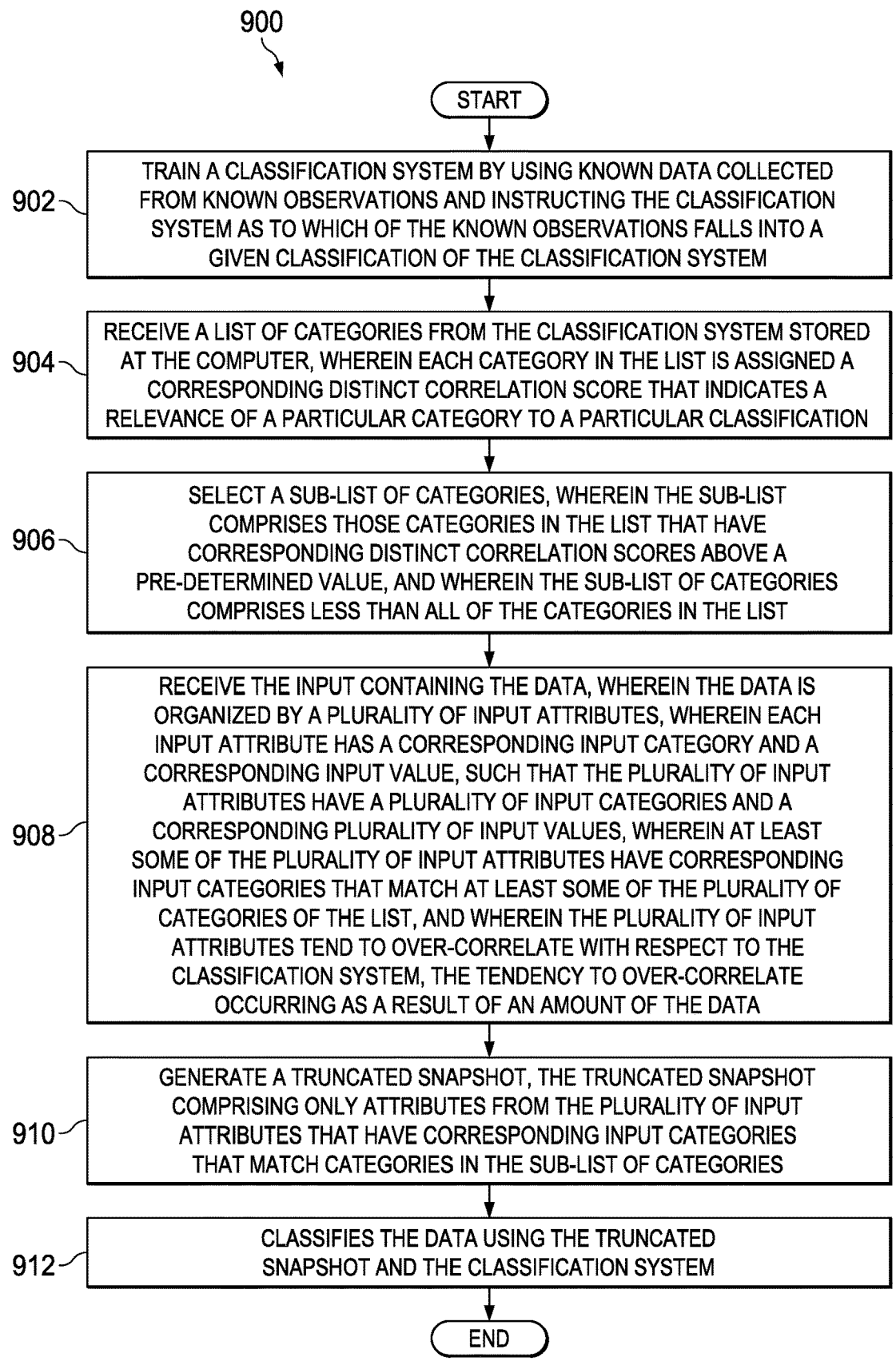
FIG. 9 illustrates a method for allowing a computer to classify an input containing data, in accordance with an illustrative embodiment.

FIG. 9 illustrates a method for allowing a computer to classify an input containing data, in accordance with an illustrative embodiment. Method 900 may be executed by a computer system, such as data processing system 1100 of FIG. 11. Method 900 is an alternative example to the methods described above with respect to FIG. 5 through FIG. 8. Method 900 refers to a "process" performing operations, though such a process may be a tangible computer implementing software to accomplish an operation, or may be hardware itself such as an application specific integrated circuit. The term "process" may also refer to a non-transitory computer readable storage medium storing computer code which, when executed by a computer, performs a computer implemented method.

Optionally, the process may begin by, prior to receiving the data, training the classification system by using known data collected from known observations and instructing the classification system as to which of the known observations falls into a given classification of the classification system (operation 902). This operation is optional as the classification system may already be trained, or possibly the classification system proceeds without training.

After training, or if training is not required for whatever reason, the computer receives a list of categories from a classification system stored at the computer, wherein each category in the list is assigned a corresponding distinct correlation score that indicates a relevance of a particular category to a particular classification (operation 904).

The computer selects a sub-list of categories, wherein the sub-list comprises those categories in the list that have corresponding distinct correlation scores above a predetermined value, and wherein the sub-list of categories comprises less than all of the categories in the list (operation 906). Selection of the sub-list may occur either before or after receiving any input data. In other words, selection of the sub-list may occur either before or after receiving a snapshot or new observation.

The computer then receives the input containing the data, wherein the data is organized by a plurality of input attributes, wherein each input attribute has a corresponding input category and a corresponding input value, such that the plurality of input attributes have a plurality of input categories and a corresponding plurality of input values, wherein at least some of the plurality of input attributes have corresponding input categories that match at least some of the plurality of categories of the list, and wherein the plurality of input attributes tend to over-correlate with respect to the classification system, the tendency to over-correlate occurring as a result of an amount of the data. (operation 908). The computer then generates a truncated snapshot, the truncated snapshot comprising only attributes from the plurality of input attributes that have corresponding input categories that match categories in the sub-list of categories (operation 910).

The computer then classifies the data using the truncated snapshot and the classification system (operation 912).

Method 900 may be varied. More or fewer steps may be present. For example, the training step at operation 902 may not be necessary. Additional operations may be present. For example, method 900 may also include selecting, by the computer, the predetermined value by subtracting a first correlation score from a second correlation score to form a difference, and selecting the second correlation score as the predetermined value when the difference exceeds a given value. In this case, the predetermined value is selected by comparing the difference to other differences in correlation between adjacent categories higher on the list, and wherein the predetermined value is selected when the difference exceeds a given percentage change in correlation relative to the other differences in correlation.

In another illustrative embodiment, method 900 may be performed using an associative memory. The associative memory comprises a plurality of data and a plurality of associations among the plurality of data, wherein the plurality of data is collected into associated groups. The associative memory is configured to be queried based on at least indirect relationships among the plurality of data. The data is received in the associative memory. In this case, selecting the sub-list may include the associative memory cycling through all of the plurality of categories, determining whether a given category has a corresponding correlation score above the predetermined value, and including the given category in the sub-list if the corresponding correlation score is above the predetermined value.

In an illustrative embodiment, for method 900, the data may be a snapshot. The snapshot is defined as an instrument used to initiate a response from the classification system given a new observation. The snapshot is generated outside of the classification system using data values unknown to the classification system.

In an illustrative embodiment, the list in method 900 may be an ordered list, ordered from highest corresponding distinct correlation score to lowest corresponding distinct correlation score. In an illustrative embodiment, the sub-list in method 900 may be performed at a time selected from the group consisting of: before receiving the input and after receiving the input. Thus, the illustrative embodiments are not necessarily limited to only those operations shown in FIG. 9.

Figure 10:
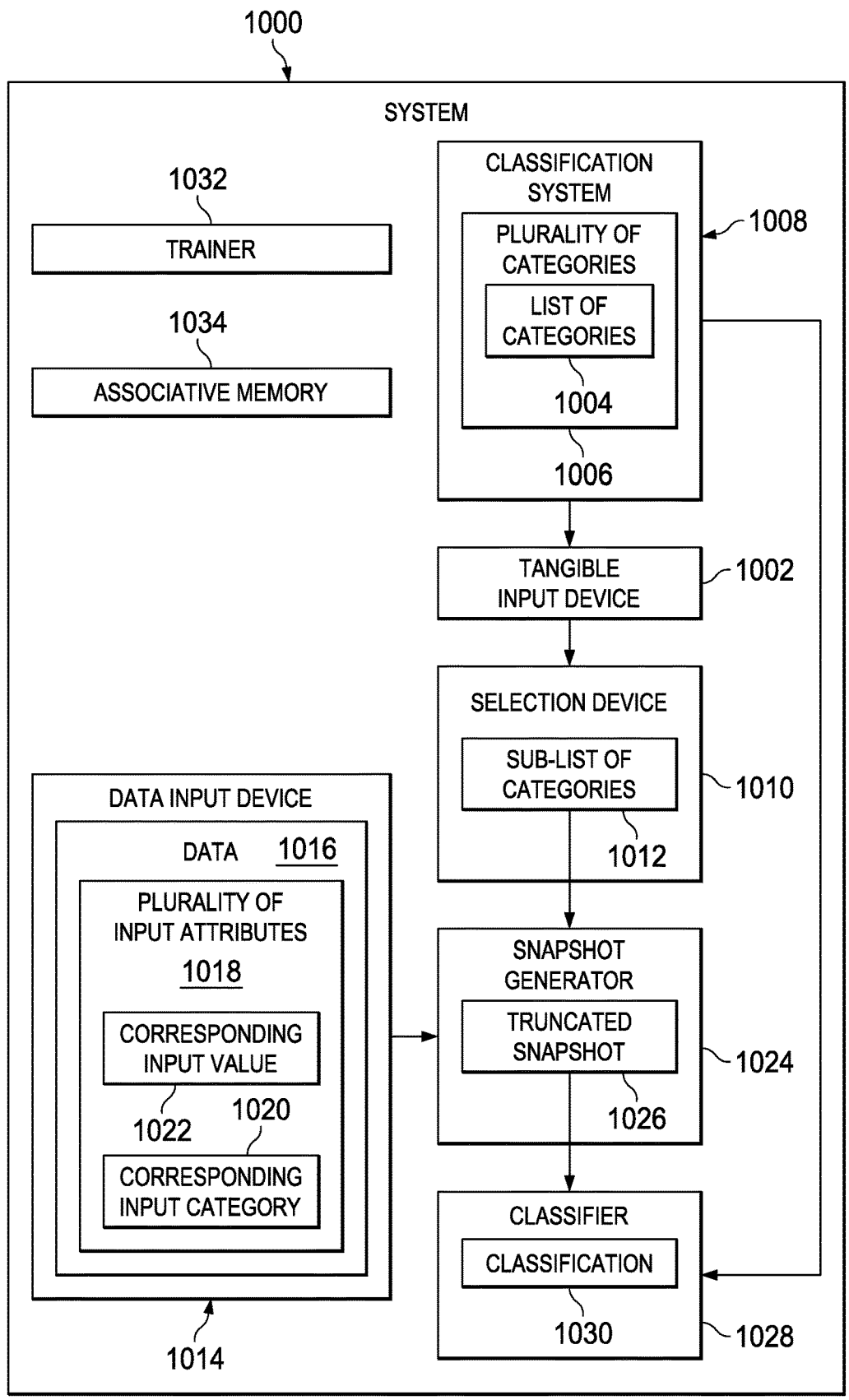
FIG. 10 illustrates a system configured to classify an input containing data, in accordance with an illustrative embodiment.

FIG. 10 illustrates a system configured to classify an input containing data, in accordance with an illustrative embodiment. System 1000 may be implemented using a data processing system, such as data processing system 1100 of FIG. 11. System 1000 may be an alternative example of the devices and techniques described with respect to FIG. 5 through FIG. 8. System 1100 may be used to implement method 900 of FIG. 9. Each of the devices shown in FIG. 10 may be implemented as one hardware device, or one or more of the devices may be combined into one device.

System 1000 includes tangible input device 1002. Tangible input device 1002 is configured to receive list of categories 1004 from plurality of categories 1006 of classification system 1008 stored at a computer. Each category in the list is assigned a corresponding distinct correlation score that indicates a relevance of a particular category to a particular classification.

System 1000 also includes selection device 1010. Selection device 1010 may be configured to select sub-list of categories 1012. Sub-list of categories 1012 may include those categories in the list that have corresponding distinct correlation scores above a predetermined value. Sub-list of categories 1012 includes less than all of the categories in the list.

System 1000 also includes data input device 1014, which is configured to receive input, the input containing data 1016. Data 1016 may be organized by plurality of input attributes 1018. Each input attribute has corresponding input category 1020 and corresponding input value 1022, such that plurality of input attributes 1018 have a plurality of input categories and a corresponding plurality of input values. At least some of plurality of input attributes 1018 have corresponding input categories that match at least some of the plurality of categories of the list of categories 1004. The plurality of input attributes 1018 tend to over-correlate with respect to classification system 1008, the tendency to over-correlate occurring as a result of an amount of data 1016.

System 1000 also includes snapshot generator 1024. Snapshot generator 1024 may be configured to generate truncated snapshot 1026. Truncated snapshot 1026 may include only attributes from plurality of input attributes 1018 that have corresponding input categories that match categories in sub-list of categories 1012.

System 1000 also includes classifier 1028. Classifier 1028 may be configured to classify data 1016 using truncated snapshot 1026 and classification system 1008. The result may be classification 1030 of data 1016.

In an illustrative embodiment, selection device 1010 may be further configured to select the predetermined value by subtracting a first correlation score from a second correlation score to form a difference, and to select the second correlation score as the predetermined value when the difference exceeds a given value. In this case, selection device 1010 may be further configured to compare the difference to other differences in correlation between adjacent categories higher on the list. In this case, the predetermined value is selected when the difference exceeds a given percentage change in correlation relative to the other differences in correlation.

System 1000 may also include trainer 1032 configured to, prior to receiving the data, train classification system 1008 by using known data collected from known observations and to instruct classification system 1008 as to which of the known observations falls into a given classification of the classification system.

In an illustrative embodiment, system 1000 may also include associative memory 1034. Associative memory 1034 may include a plurality of data and a plurality of associations among the plurality of data. The plurality of data is collected into associated groups. Associative memory 1034 may be configured to be queried based on at least indirect relationships among the plurality of data. The data is received in associative memory 1034. Associative memory 1034 may be associative memory 1128 in FIG. 11. In this illustrative embodiment, selection device 1010 may be configured to select sub-list of categories 1012 by associative memory 1034 cycling through all of the plurality of categories, determining whether a given category has a corresponding correlation score above the predetermined value, and including the given category in sub-list of categories 1012 if the corresponding correlation score is above the predetermined value.

In an illustrative embodiment, data 1016 may be a snapshot. The snapshot is defined as an instrument used to initiate a response from classification system 1008 given a new observation. The snapshot is generated outside of classification system 1008 using data values unknown to classification system 1008. In an illustrative embodiment, list of categories 1004 may be an ordered list, ordered from highest corresponding distinct correlation score to lowest corresponding distinct correlation score.

The illustrative embodiments are not necessarily limited to the examples shown in FIG. 10. Other alternatives are also possible, as described elsewhere herein. Thus, the claimed inventions are not necessarily limited by the examples described with respect to FIG. 10.

The illustrative embodiments described with respect to FIG. 10 may be further varied, as described with respect to FIG. 5 through FIG. 8. Thus, the illustrative embodiments described with respect to FIG. 9 do not necessarily limit the claimed inventions.

Figure 11:
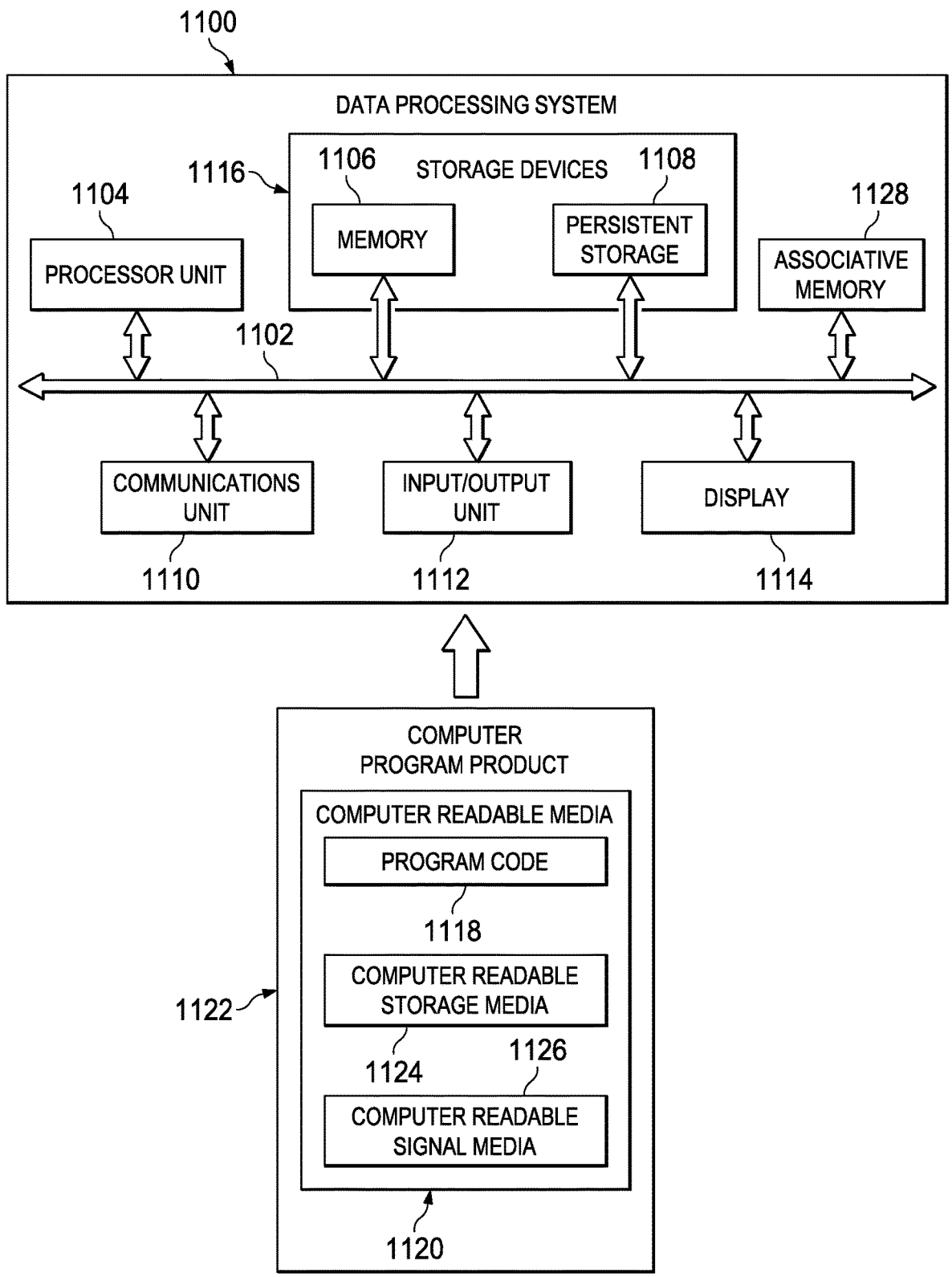
FIG. 11 illustrates a data processing system, in accordance with an illustrative embodiment.

FIG. 11 illustrates a data processing system, in accordance with an illustrative embodiment. Data processing system 1100 in FIG. 11 is an example of a data processing system that may be used to implement the illustrative embodiments, such as the techniques described with respect to FIG. 5 through FIG. 8, method 900 of FIG. 9, system 1000 of FIG. 10, or any other module or system or process disclosed herein.

In this illustrative example, data processing system 1100 includes communications fabric 1102, which provides communications between processor unit 1104, memory 1106, persistent storage 1108, communications unit 1110, input/output (I/O) unit 1112, and display 1114. Processor unit 1104 serves to execute instructions for software that may be loaded into memory 1106. Processor unit 1104 may be a number of processors, a multi-processor core, or some other type of processor, depending on the particular implementation. "A number," as used herein with reference to an item, means one or more items. Further, processor unit 1104 may be implemented using a number of heterogeneous processor systems in which a main processor is present with secondary processors on a single chip. As another illustrative example, processor unit 1104 may be a symmetric multi-processor system containing multiple processors of the same type.

Memory 1106 and persistent storage 1108 are examples of storage devices 1116. A storage device is any piece of hardware that is capable of storing information, such as, for example, without limitation, data, program code in functional form, and/or other suitable information either on a temporary basis and/or a permanent basis. Storage devices 1116 may also be referred to as computer readable storage devices in these examples. Memory 1106, in these examples, may be, for example, a random access memory or any other suitable volatile or non-volatile storage device. Persistent storage 1108 may take various forms, depending on the particular implementation.

For example, persistent storage 1108 may contain one or more components or devices. For example, persistent storage 1108 may be a hard drive, a flash memory, a rewritable optical disk, a rewritable magnetic tape, or some combination of the above. The media used by persistent storage 1108 also may be removable. For example, a removable hard drive may be used for persistent storage 1108.

Communications unit 1110, in these examples, provides for communications with other data processing systems or devices. In these examples, communications unit 1110 is a network interface card. Communications unit 1110 may provide communications through the use of either or both physical and wireless communications links.

Input/output (I/O) unit 1112 allows for input and output of data with other devices that may be connected to data processing system 1100. For example, input/output (I/O) unit 1112 may provide a connection for user input through a keyboard, a mouse, and/or some other suitable input device. Further, input/output (I/O) unit 1112 may send output to a printer. Display 1114 provides a mechanism to display information to a user.

Instructions for the operating system, applications, and/or programs may be located in storage devices 1116, which are in communication with processor unit 1104 through communications fabric 1102. In these illustrative examples, the instructions are in a functional form on persistent storage 1108. These instructions may be loaded into memory 1106 for execution by processor unit 1104. The processes of the different embodiments may be performed by processor unit 1104 using computer implemented instructions, which may be located in a memory, such as memory 1106.

These instructions are referred to as program code, computer usable program code, or computer readable program code that may be read and executed by a processor in processor unit 1104. The program code in the different embodiments may be embodied on different physical or computer readable storage media, such as memory 1106 or persistent storage 1108.

Program code 1118 is located in a functional form on computer readable media 1120 that is selectively removable and may be loaded onto or transferred to data processing system 1100 for execution by processor unit 1104. Program code 1118 and computer readable media 1120 form computer program product 1122 in these examples. In one example, computer readable media 1120 may be computer readable storage media 1124 or computer readable signal media 1126. Computer readable storage media 1124 may include, for example, an optical or magnetic disk that is inserted or placed into a drive or other device that is part of persistent storage 1108 for transfer onto a storage device, such as a hard drive, that is part of persistent storage 1108. Computer readable storage media 1124 also may take the form of a persistent storage, such as a hard drive, a thumb drive, or a flash memory, that is connected to data processing system 1100. In some instances, computer readable storage media 1124 may not be removable from data processing system 1100.

Alternatively, program code 1118 may be transferred to data processing system 1100 using computer readable signal media 1126. Computer readable signal media 1126 may be, for example, a propagated data signal containing program code 1118. For example, computer readable signal media 1126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1118 may be downloaded over a network to persistent storage 1108 from another device or data processing system through computer readable signal media 1126 for use within data processing system 1100. For instance, program code stored in a computer readable storage medium in a server data processing system may be downloaded over a network from the server to data processing system 1100. The data processing system providing program code 1118 may be a server computer, a client computer, or some other device capable of storing and transmitting program code 1118.

The different components illustrated for data processing system 1100 are not meant to provide architectural limitations to the manner in which different embodiments may be implemented. The different illustrative embodiments may be implemented in a data processing system including components in addition to or in place of those illustrated for data processing system 1100. Other components shown in FIG. 11 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1104 may take the form of a hardware unit that has circuits that are manufactured or configured for a particular use. This type of hardware may perform operations without needing program code to be loaded into a memory from a storage device to be configured to perform the operations.

For example, when processor unit 1104 takes the form of a hardware unit, processor unit 1104 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 1118 may be omitted because the processes for the different embodiments are implemented in a hardware unit.

In still another illustrative example, processor unit 1104 may be implemented using a combination of processors found in computers and hardware units. Processor unit 1104 may have a number of hardware units and a number of processors that are configured to run program code 1118. With this depicted example, some of the processes may be implemented in the number of hardware units, while other processes may be implemented in the number of processors.

As another example, a storage device in data processing system 1100 is any hardware apparatus that may store data. Memory 1106, persistent storage 1108, and computer readable media 1120 are examples of storage devices in a tangible form.

In another example, a bus system may be used to implement communications fabric 1102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1106, or a cache, such as found in an interface and memory controller hub that may be present in communications fabric 1102.

Data processing system 1100 may also include associative memory 1128. Associative memory 1128 may be the associative memory mentioned in the description of FIG. 10 and elsewhere herein, and may have the properties described elsewhere herein. Associative memory 1128 may be in communication with communications fabric 1102. Associative memory 1128 may also be in communication with, or in some illustrative embodiments, be considered part of storage devices 1116. While one associative memory 1128 is shown, additional associative memories may be present.

As used herein, the term "associative memory" refers to a plurality of data and a plurality of associations among the plurality of data. The plurality of data and the plurality of associations may be stored in a non-transitory computer readable storage medium. The plurality of data may be collected into associated groups. The associative memory may be configured to be queried based on at least indirect relationships among the plurality of data in addition to direct correlations among the plurality of data. Thus, an associative memory may be configured to be queried based solely on direct relationships, based solely on at least indirect relationships, as well as based on combinations of direct and at least indirect relationships. An associative memory may be a content addressable memory.

Thus, an associative memory may be characterized as a plurality of data and a plurality of associations among the plurality of data. The plurality of data may be collected into associated groups. Further, the associative memory may be configured to be queried based on at least one relationship, selected from a group that includes direct and at least indirect relationships, or from among the plurality of data in addition to direct correlations among the plurality of data. An associative memory may also take the form of software. Thus, an associative memory also may be considered a process by which information is collected into associated groups in the interest of gaining new insight based on relationships rather than direct correlation. An associative memory may also take the form of hardware, such as specialized processors or a field programmable gate array.

As used herein, the term "entity" refers to an object that has a distinct, separate existence, though such existence need not be a material existence. Thus, abstractions and legal constructs may be regarded as entities. As used herein, an entity need not be animate. Associative memories work with entities.

The different illustrative embodiments can take the form of an entirely hardware embodiment, an entirely software embodiment, or an embodiment containing both hardware and software elements. Some embodiments are implemented in software, which includes but is not limited to forms such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or computer usable program code such that when the computer readable or computer usable program code is executed on a computer, the execution of this computer readable or computer usable program code causes the computer to transmit another computer readable or computer usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for classifying an input containing data by a computer, the method comprising:
receiving, by the computer, a list of categories from a classification system stored at the computer, wherein each category in the list is assigned a corresponding distinct correlation score that indicates a relevance of a particular category to a particular classification, wherein the distinct correlation score for each category is based on an accumulation of scores for a number of category values for the category;
selecting, by the computer, a sub-list of categories, wherein the sub-list comprises those categories in the list that have corresponding distinct correlation scores above a predetermined value, and wherein the sub-list of categories comprises less than all of the categories in the list;
receiving, by the computer, the input containing the data, wherein the data comprises a snapshot, wherein the data is organized by a plurality of input attributes, wherein each input attribute has a corresponding input category and a corresponding input value, such that the plurality of input attributes has a plurality of input categories and a corresponding plurality of input values, wherein at least some of the plurality of input attributes has corresponding input categories that match at least some of a plurality of categories of the list;
generating, by the computer, a truncated snapshot, the truncated snapshot comprising only attributes from the plurality of input attributes that have the corresponding input categories that match categories in the sub-list of categories; and
classifying the data, by the computer, using the truncated snapshot and the classification system.

2. The method of claim 1 further comprising:
selecting, by the computer, the predetermined value by subtracting a first correlation score from a second correlation score to form a difference, and selecting the second correlation score as the predetermined value when the difference exceeds a given value.

3. The method of claim 2, wherein the list is an ordered list, wherein the predetermined value is selected by comparing the difference to other differences in correlation scores between adjacent categories higher on the list, and wherein the predetermined value is selected when the difference exceeds a given percentage change in correlation scores relative to the other differences in correlation scores.

4. The method of claim 1 further comprising:
prior to receiving the data, training the classification system by using known data collected from known observations and instructing the classification system as to which of the known observations falls into a given classification of the classification system.

5. The method of claim 1, wherein the computer comprises a processor and an associative memory, the associative memory comprising a plurality of data and a plurality of associations among the plurality of data, wherein the plurality of data is collected into associated groups, wherein the associative memory is configured to be queried based on at least indirect relationships among the plurality of data, wherein the data is received in the associative memory, and wherein the step of selecting the sub-list further comprises: the associative memory cycling through all of the plurality of categories, determining whether a given category has a corresponding correlation score above the predetermined value, and including the given category in the sub-list if the corresponding correlation score is above the predetermined value.

6. The method of claim 1, wherein the list is ordered from highest corresponding distinct correlation score to lowest corresponding distinct correlation score.

7. The method of claim 1, wherein selecting the sub-list is performed at a time selected from the group consisting of: before receiving the input and after receiving the input.

8. The method of claim 1, wherein the computer selects the predetermined value either by (1) subtracting a first correlation score from a second correlation score to form a difference, and selecting the second correlation score as the predetermined value when the difference exceeds a given value, or (2) selecting the predetermined value by comparing the difference to other differences in correlation scores between adjacent categories higher on the list, and wherein the predetermined value is selected when the difference exceeds a given percentage change in correlation scores relative to the other differences.

9. A data processing system comprising:
a processor;
a bus connected to the processor;
a non-transitory computer readable storage medium connected to the bus, the non-transitory computer readable storage medium storing a computer program product which, when executed by the processor, performs a computer implemented method for classifying an input containing data, the computer program product comprising:
computer usable program code for receiving a list of categories from a classification system stored at the computer, wherein each category in the list is assigned a corresponding distinct correlation score that indicates a relevance of a particular category to a particular classification, wherein the distinct correlation score for each category is based on an accumulation of scores for a number of category values for the category;
computer usable program code for selecting a sub-list of categories, wherein the sub-list comprises those categories in the list that have corresponding distinct correlation scores above a predetermined value, and wherein the sub-list of categories comprises less than all of the categories in the list;
computer usable program code for receiving the input containing the data, wherein the data comprises a snapshot, wherein the data is organized by a plurality of input attributes, wherein each input attribute has a corresponding input category and a corresponding input value, such that the plurality of input attributes has a plurality of input categories and a corresponding plurality of input values, wherein at least some of the plurality of input attributes has corresponding input categories that match at least some of a plurality of categories of the list of categories;
computer usable program code for generating a truncated snapshot, the truncated snapshot comprising only attributes from the plurality of input attributes that have corresponding input categories that match categories in the sub-list of categories; and
computer usable program code for classifying the data using the truncated snapshot and the classification system.

10. The data processing system of claim 9, wherein the computer program product further comprises:
computer usable program code for selecting the predetermined value by subtracting a first correlation score from a second correlation score to form a difference, and selecting the second correlation score as the predetermined value when the difference exceeds a given value.

11. The data processing system of claim 10, wherein the list is an ordered list, wherein the predetermined value is selected by comparing the difference to other differences in correlation scores between adjacent categories higher on the list, and wherein the predetermined value is selected when the difference exceeds a given percentage change in correlation scores relative to the other differences in correlation scores.

12. The data processing system of claim 9, wherein the computer program product further comprises: computer usable program code for, prior to receiving the data, training the classification system by using known data collected from known observations and instructing the classification system as to which of the known observations falls into a given classification of the classification system.

13. The data processing system of claim 9, wherein the computer selects the predetermined value either by (1) subtracting a first correlation score from a second correlation score to form a difference, and selecting the second correlation score as the predetermined value when the difference exceeds a given value, or (2) selecting the predetermined value by comparing the difference to other differences in correlation scores between adjacent categories higher on the list, and wherein the predetermined value is selected when the difference exceeds a given percentage change in correlation scores relative to the other differences.

14. A system on an aircraft configured to classify an input containing data, the system comprising:
a processor;
a bus connected to the processor;
a non-transitory computer readable storage medium connected to the bus;
sensors configured to gather the input on or within the aircraft;
a tangible input device stored in the non-transitory computer readable storage medium and configured to receive a list of categories from a classification system stored at a computer, wherein each category in the list is assigned a corresponding distinct correlation score that indicates a relevance of a particular category to a particular classification, wherein the distinct correlation score for each category is based on an accumulation of scores for a number of category values for the category;
a selection device stored in the non-transitory computer readable storage medium and configured to select a sub-list of categories, wherein the sub-list comprises those categories in the list that have corresponding distinct correlation scores above a predetermined value, and wherein the sub-list of categories comprises less than all of the categories in the list;
a data input device stored in the non-transitory computer readable storage medium and configured to receive the input, the input containing the data, wherein the data comprises a snapshot, wherein the data is organized by a plurality of input attributes, wherein each input attribute has a corresponding input category and a corresponding input value, such that the plurality of input attributes has a plurality of input categories and a corresponding plurality of input values, wherein at least some of the plurality of input attributes has corresponding input categories that match at least some of a plurality of categories of the list;
a snapshot generator stored in the non-transitory computer readable storage medium and configured to generate a truncated snapshot, the truncated snapshot comprising only attributes from the plurality of input attributes that have corresponding input categories that match categories in the sub-list of categories; and
a classifier stored in the non-transitory computer readable storage medium and configured to classify the data using the truncated snapshot and the classification system.

15. The system of claim 14, wherein the selection device is further configured to select the predetermined value by subtracting a first correlation score from a second correlation score to form a difference, and to select the second correlation score as the predetermined value when the difference exceeds a given value.

16. The system of claim 15, wherein the list is an ordered list, wherein the selection device is further configured to compare the difference to other differences in correlation scores between adjacent categories higher on the list, and wherein the predetermined value is selected when the difference exceeds a given percentage change in correlation scores relative to the other differences in correlation scores.

17. The system of claim 14 further comprising:
a trainer stored in the non-transitory computer readable storage medium and configured to, prior to receiving the data, train the classification system by using known data collected from known observations and to instruct the classification system as to which of the known observations falls into a given classification of the classification system.

18. The system of claim 14, wherein the system further comprises:
an associative memory, the associative memory comprising a plurality of data and a plurality of associations among the plurality of data, wherein the plurality of data is collected into associated groups, wherein the associative memory is stored in the non-transitory computer readable storage medium and configured to be queried based on at least indirect relationships among the plurality of data, wherein the data is received in the associative memory, and wherein the selection device is configured to select the sub-list by: the associative memory cycling through all of the plurality of categories, determining whether a given category has a corresponding correlation score above the predetermined value, and including the given category in the sub-list if the corresponding correlation score is above the predetermined value.

19. The system of claim 14, wherein the list is ordered from highest corresponding distinct correlation score to lowest corresponding distinct correlation score.

20. The system of claim 14, wherein the computer selects the predetermined value either by (1) subtracting a first correlation score from a second correlation score to form a difference, and selecting the second correlation score as the predetermined value when the difference exceeds a given value, or (2) selecting the predetermined value by comparing the difference to other differences in correlation scores between adjacent categories higher on the list, and wherein the predetermined value is selected when the difference exceeds a given percentage change in correlation scores relative to the other differences.

* * * * *